(12) United States Patent
Chiashi

(10) Patent No.: US 8,863,801 B2
(45) Date of Patent: Oct. 21, 2014

(54) PNEUMATIC RADIAL TIRE

(75) Inventor: Hideyuki Chiashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1488 days.

(21) Appl. No.: 12/067,692

(22) PCT Filed: Sep. 8, 2006

(86) PCT No.: PCT/JP2006/317826
§ 371 (c)(1),
(2), (4) Date: Sep. 9, 2008

(87) PCT Pub. No.: WO2007/037111
PCT Pub. Date: Apr. 5, 2007

(65) Prior Publication Data
US 2009/0133795 A1    May 28, 2009

(30) Foreign Application Priority Data

Sep. 27, 2005 (JP) .................... 2005-279786

(51) Int. Cl.
*B60C 9/11* (2006.01)
*B60C 9/00* (2006.01)
*B60C 9/22* (2006.01)
*B60C 9/20* (2006.01)

(52) U.S. Cl.
CPC .............. *B60C 9/22* (2013.01); *B60C 9/0007* (2013.01); *B60C 9/2006* (2013.01)
USPC ........... 152/556; 152/451; 152/527; 152/548; 152/563

(58) Field of Classification Search
CPC .......... B60C 9/0238; B60C 9/04; B60C 9/11; B60C 9/16; B60C 9/20; B60C 9/2006; B60C 9/22
USPC .......................... 152/451, 527, 556, 563, 548
See application file for complete search history.

(56) References Cited

U.S. PATENT DOCUMENTS

| 4,609,024 A | 9/1986 | Yatsunami et al. |
| 5,311,917 A | 5/1994 | Ikehara et al. |

(Continued)

FOREIGN PATENT DOCUMENTS

| EP | 0 752 325 A1 | 1/1997 |
| EP | 0 893 282 A2 | 1/1999 |

(Continued)

OTHER PUBLICATIONS

JPO Englsih Abstract fro JP 2007-090937, 2007.*
English machine translation of JP 09-158065, retrieved from JPO database Aug. 12, 2011.*
English machine translation of JP 11-310005, retrieved from JPO database Aug. 12, 2011.*

*Primary Examiner* — Timothy Kennedy
(74) *Attorney, Agent, or Firm* — Sughrue Mion, PLLC

(57) ABSTRACT

There is provided a pneumatic radial tire having favorable steering stability required as a high performance radial tire designed for high performance cars, durability and good cost performance. The pneumatic radial tire is framed by a carcass 1 toroidally extending between a pair of bead portions 11 and has at least two layers of crossing belt layers 2 (2a, 2b) formed by rubberizing steel cords and disposed around an outside of a crown portion thereof in a radial direction. The steel cord has a single strand structure or a core-single layer sheath structure composed of six to ten steel wires of 0.10 to 0.20 mm in diameter, a number of driven steel cords is 40 cords/50 mm or more and a distance between the adjacent steel cords within the belt layer is 0.3 mm or more.

4 Claims, 2 Drawing Sheets

(56) References Cited

U.S. PATENT DOCUMENTS

| | | | |
|---|---|---|---|
| 5,396,942 A | | 3/1995 | Ikehara et al. |
| 5,584,169 A | * | 12/1996 | Ikehara ............ 57/212 |
| 5,676,776 A | | 10/1997 | Ikehara |
| 2005/0241741 A1 | * | 11/2005 | Nakagawa et al. ......... 152/556 |

FOREIGN PATENT DOCUMENTS

| | | |
|---|---|---|
| JP | 59-038102 A | 3/1984 |
| JP | 60-185602 A | 9/1985 |
| JP | 60-178204 U | 11/1985 |
| JP | 63-002702 A | 1/1988 |
| JP | 63-002703 A | 1/1988 |
| JP | 63-002704 A | 1/1988 |
| JP | 64-085381 A | 3/1989 |
| JP | 64-085382 A | 3/1989 |
| JP | 64-085383 A | 3/1989 |
| JP | 64-085384 A | 3/1989 |
| JP | 01-141103 A | 6/1989 |
| JP | 02-306801 A | 12/1990 |
| JP | 03-074206 A | 3/1991 |
| JP | 03-143703 A | 6/1991 |
| JP | 09158065 A * | 6/1997 |
| JP | 10-008387 A | 1/1998 |
| JP | 11-310005 A | 11/1999 |

* cited by examiner

PNEUMATIC RADIAL TIRE

TECHNICAL FIELD

The present invention relates to a pneumatic radial tire (also simply referred to as a "tire" hereinafter) and more specifically to a pneumatic radial tire that excels in steering stability and is preferably used for high-performance cars and the like.

BACKGROUND ART

In general, a pneumatic radial tire is framed by a carcass extending toroidally between a pair of bead portions and belt layers composed of rubberized steel cords are disposed as reinforcing layers on an outside of the carcass in a radial direction of the tire. The steel cords used for such belt layers have been studied variously since the past from aspects of improving steering stability and riding comfortability.

For example, Patent Literature 1 describes a technology for improving steerage, stability and others during cornering by using specific steel cords of thin wires (diameter of the wire: 0.06 to 0.10 mm). Patent Literature 2 discloses a tire specifying steel cords by bending resistance and tensile elongation and Patent Literatures 3 to 5 disclose a tire specifying a belt layer by a relational expression of a diameter of the cord, a number of filaments within one cord and a number of driven cords of the belt layer, respectively.

Furthermore, Patent Literature 6 discloses a tire having steel cords composed of predetermined steel filaments and specifying a predetermined range of values defined by belt bending rigidity, strength of the cord and an amount of voids of the belt cords and Patent Literatures 7 through 9 disclose tire reinforcing steel cords having a predetermined strand structure and specifying a predetermined range of values defined by strength of the cord, elongation when the cord ruptures and cord bending rigidity. Still more, Patent Literature 10 discloses a tire specifying a belt by a belt cord strand structure, a diameter of wire and a number of driven belt cords, Patent Literature 11 discloses a tire that meets predetermined requirements in terms of a strand structure, bending strength/cord strength ratio, strength of cord and a diameter of wire and Patent Literature 12 discloses a tire in which a belt ply specifying a belt cord structure and a number of driven cords is disposed through an intermediary of cushion rubber, respectively.

Patent Literature 1: Japanese Patent Application Laid-open No. Sho.59-38102 Gazette (Claims and others)
Patent Literature 2: Japanese Patent Application Laid-open No. Sho.60-185602 Gazette (Claims and others)
Patent Literature 3: Japanese Patent Application Laid-open No. Sho.63-2702 Gazette (Claims and others)
Patent Literature 4: Japanese Patent Application Laid-open No. Sho.63-2703 Gazette (Claims and others)
Patent Literature 5: Japanese Patent Application Laid-open No. Sho.63-2704 Gazette (Claims and others)
Patent Literature 6: Japanese Patent Application Laid-open No. Sho.64-85381 Gazette (Claims and others)
Patent Literature 7: Japanese Patent Application Laid-open No. Sho.64-85382 Gazette (Claims and others)
Patent Literature 8: Japanese Patent Application Laid-open No. Sho.64-85383 Gazette (Claims and others)
Patent Literature 9: Japanese Patent Application Laid-open No. Sho.64-85384 Gazette (Claims and others)
Patent Literature 10: Japanese Patent Application Laid-open No. Hei.1-141103 Gazette (Claims and others)
Patent Literature 11: Japanese Patent Application Laid-open No. Hei.3-74206 Gazette (Claims and others)
Patent Literature 12: Japanese Patent Application Laid-open No. Hei.3-143703 Gazette (Claims and others)

DISCLOSURE OF INVENTION

Problem to be solved by the Invention

The technologies for applying the steel cords whose wire diameter is thin and whose bending rigidity is low to a belt in order to improve the steering stability and riding comfortability have been studied and proposed variously as described above.

However, as described in Patent Literatures 1, 2 and 6 through 9, the technologies for improving the steering stability by applying a double stranded steel cord using the thin wire have had problems that its productivity is low and its cost is high because the diameter of the wire is so thin and the wire is doubly stranded and that its corrosion fatigue is prone to drop because its rubber penetrability is low as compared to a single stranded cord used in general as a belt cord. Specifically, although the technologies in Patent Literatures 7 through 9 aim at improving the rubber penetrability by improving the strand structures, it has been difficult to obtain good rubber penetrability equivalent to that of the single stranded cord. Therefore, its use has been limited to special ones such as racing tires and it has been difficult to apply it to more general high performance radial tires designed for high performance cars.

Furthermore, although the technologies described in Patent Literatures 3 through 5 try to suppress belt-end separation by improving follow-up quality of the cord to deformation of tread by applying the steel cord whose bending rigidity is low to the belt, they disclose no technology for assuring tensile rigidity and in-plane bending rigidity of the belt necessary for the high performance radial tire. Although the technologies described in Patent Literatures 10 through 12 also try to improve the riding comfortability and others by applying the steel cord whose bending rigidity is low to the belt, they disclose no technology for assuring tensile rigidity and in-plane bending rigidity of the belt necessary for the high performance radial tire.

Accordingly, the prior art technologies have not been what fully meet the requests concerning the steering stability and riding comfortability of the present state and a technology that highly meets these requests has been expected. Then, a purpose of the invention is to provide a pneumatic radial tire that solves the aforementioned problems of the prior art technologies and has good steering stability necessary as a high performance radial tire designed for high performance cars, durability and good cost performance.

Means for solving the Problems

The inventor has found the following points as a result of ardent study to solve the aforementioned problems.

That is, important characteristics necessary for belt layers to assure the steering stability as a high performance radial tire are that the tensile rigidity in a peripheral direction is high, that the in-plane bending rigidity is high and that out-plane bending rigidity is low.

A belt member needs to have large rigidity in the peripheral direction to exhibit an effect of a retainer band by bearing tension caused by internal pressure. To that end, the belt layer must have, firstly, high tensile rigidity in the peripheral direction. Still more, because the belt member receives in-plane bending deformation during cornering, a tire having a belt whose in-plane bending deformation is small can exhibit good steering stability by generating large cornering force. Therefore, secondly, the belt layer must have the high in-plane bending rigidity. The belt member also receives large in-plane bending deformation near a marginal point of cornering. The belt layer receives large compressive deformation inside of the bending deformation due to this deformation and causes buckling. However, it becomes possible to suppress the buckling deformation by internal pressure of the tire by lowering the out-plane deformation pressure based on compression by lowering out-plane bending rigidity of the two layers of belt layers. It allows pressure of ground contact to be leveled by suppressing escape of the pressure of ground contact. Therefore, thirdly, the belt layer needs to have the low out-plane bending rigidity.

The inventor has found that the tire having the desirable steering stability, durability and cost performance may be realized by arranging the tire as described below as a result of the ardent study from the point of views described above and have consummated the present invention.

That is, a pneumatic radial tire of the invention is framed by a carcass toroidally extending between a pair of bead portions and having at least two layers of crossing belt layers formed by rubberizing steel cords and disposed around an outside of a crown portion thereof in a radial direction, wherein the steel cord has a single strand structure or a core-single layer sheath structure composed of six to ten steel wires of 0.10 to 0.20 mm in diameter, a number of driven steel cords is 40 cords/50 mm or more and a distance between the adjacent steel cords within the belt layer is 0.3 mm or more.

Preferably, the steel cord has a structure stranded so as to have gaps into which rubber can infiltrate between at least one set of adjacent steel wires positioned at an outermost layer of the cord in the present invention. Still more, preferably a sectional shape of the steel cord is flat and the flat sections in a major axis direction are arrayed along a width direction of the belt layer. Specifically, the steel cord has a core-single layer sheath structure in which two steel wires disposed in parallel without being stranded are placed as a core and remaining steel wires are stranded around the core so as to have gaps into which rubber can infiltrate between at least one set of adjacent steel wires.

Furthermore, preferably the number of driven steel cords is 40 to 60 cords/50 mm and the distance between the adjacent steel cords with in the belt layer is 0.4 to 1.0 mm.

Effect of the Invention

According to the invention, it has become possible to realize the pneumatic radial tire having the good steering stability that is required as a high performance radial tire designed for high performance cars, the durability and the cost performance by arranging as described above.

REFERENCE NUMERALS

1 CARCASS
2(2a, 2b) CROSSING BELT LAYERS
3 BEAD CORE
4 CAP LAYER
5 LAYER
11 BEAD PORTION
12 TREAD PORTION
13 SIDEWALL PORTION

BEST MODE FOR CARRYING OUT THE INVENTION

A preferred embodiment of the invention will be explained below in detail.

Figure 1:
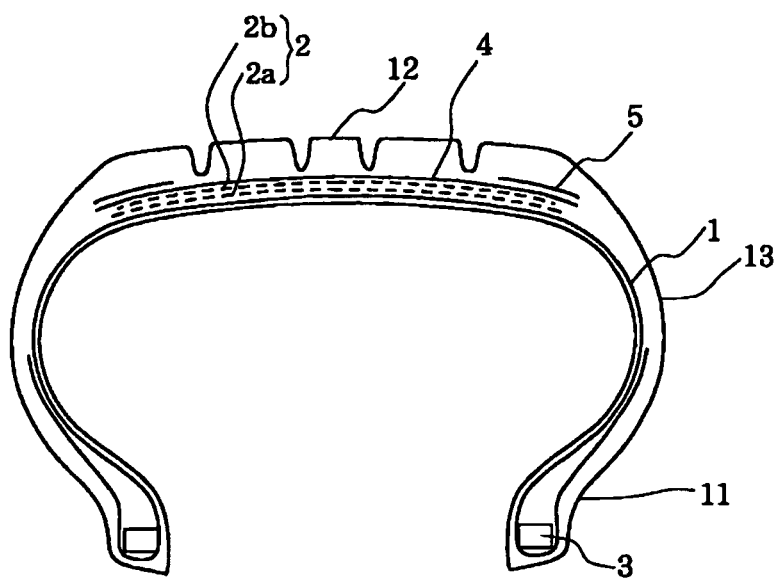
FIG. 1 is a schematic section view of a pneumatic radial tire according to one embodiment of the invention.

FIG. 1 shows a schematic section view of one exemplary pneumatic radial tire of the invention. As shown in the figure, the tire of the invention is framed by the carcass 1 toroidally extending between a pair of bead portions 11 and at least two layers of crossing belt layers 2 (2a, 2b) formed by rubberizing steel cords are disposed around an outside of a crown portion thereof in a radial direction.

In the invention, the steel cords of the crossing belt layers 2 have a single strand structure or a core-single layer sheath structure composed of six to ten steel wires of 0.10 to 0.20 mm or preferably 0.15 mm to 0.20 mm in diameter.

The wire having the diameter of 0.10 to 0.20 mm has been adopted because bending rigidity of the cord becomes high and it becomes difficult to lower out-of-plane bending rigidity of the belt layers if the diameter of the wire exceeds 0.20 mm. When the diameter of the wire is less than 0.10 mm in contrary, it becomes difficult to obtain high tensile rigidity in a peripheral direction and increases costs under conditions conforming to the invention of a number of wires and of distance between the adjacent cords.

Furthermore, while the bending rigidity increases when many wires are used due to interference among the wires when the cord is bent, the interference among the wires less influences the bending rigidity in the invention because the number of wires is so small as ten or less. However, when the number of wires is less than six, it becomes difficult to obtain the high tensile rigidity in the peripheral direction under the conditions conforming to the invention of the number of wires and of the distance between the adjacent cords.

Figure 3:
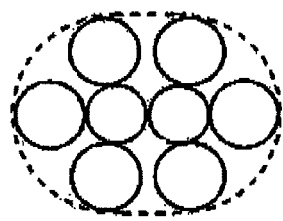
FIG. 3 is a schematic section view showing a non-limiting embodiment of the steel cord having a core-single layer sheath structure.
Figure 4:
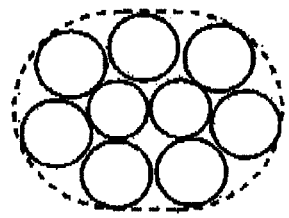
FIG. 4 is a schematic section view showing another non-limiting embodiment of the steel cord having a core-single layer sheath structure.

Still more, because the steel cords are arranged to have the single strand structure or the core-single layer sheath structure composed of six to ten steel wires, i.e., a maximum number of wires is limited and the simple strand structure is adopted, rubber penetrability may be readily assured. Specifically, it is preferable to have an open structure in which the steel cord is stranded so as to have gaps into which rubber can infiltrate at least between a set of adjacent steel wires located at a cord outermost layer (see, e.g., FIGS. 3 and 4). It also brings about a merit that it increases productivity as compared to a complex strand cord, thus lowering the cost.

A number of driven steel cords is 40 cords/50 mm or more, preferably 40 to 60 cords/50 mm in the invention. The number of driven steel cords has been determined to be 40 cords/50 mm or more because (1) it is necessary to assure a least minimum steel occupant ratio in order to obtain the required tensile rigidity in the peripheral direction and the tensile rigidity in the peripheral direction and (2) because the smaller and the more the number of the meshes of the steel cords formed by the upper and lower belt layers, the higher the tensile rigidity in the peripheral direction of the crossing belt layers and the tensile rigidity in the peripheral direction become even if the steel occupant ratio is the same.

While it is specially preferable to effectively utilize the effect of (2) described above here by increasing the number of driven cords when the diameter of the wire is smaller or when the number of wires is less, it is essential to arrange such that the distance between the adjacent steel cords within the belt layers is 0.3 mm or more. When the distance between the adjacent steel cords within the belt layers is less than 0.3 mm, a fine crack generated at an end of the steel cord may grow straddling across the adjacent steel cords and may be connected across the belt laminate layers. Thus, it rapidly expands, remarkably increasing speed of development of crack leading to belt separation. Accordingly, the distance between such adjacent steel cords is preferable to be 0.4 to 1.0 mm.

Figure 2:
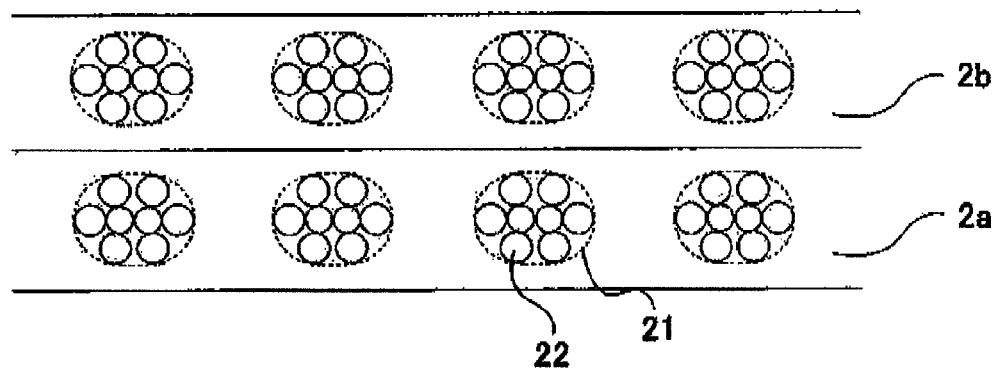
FIG. 2 is a schematic section view showing a steel cord according to a non-limiting embodiment of the invention.

Alternatively, preferably, higher in-plane bending rigidity and lower out-plane bending rigidity may be obtained by flattening a sectional shape of the steel cord and by arraying the flat sections in a major axis direction along a width direction of the belt layer. It is also effective for assuring the rubber penetrability. For example, as shown in FIG. 2, a sectional shape of the steel cord 21, containing the steel wires 22, is flat and the flat sections in the major axis direction are arrayed along a width direction of the belt layers 2a and 2b.

As the structure of the steel cord whose sectional shape is flat, it is possible to apply a single strand structure in which a spiral shape of the wire is squeezed in one direction or a structure in which a core formed by two steel wires disposed in parallel without being stranded from each other is formed and a sheath is formed by stranding steel wires around it. It is specially preferable to apply the steel cord such as 2 in parallel +4-7 having the core-single layer sheath structure in which the core is formed by the two steel wires disposed in parallel without being stranded from each other and the remaining steel wires are stranded thereabouts so as to have gaps into which rubber can infiltrate between at least one set of adjacent steel wires because it allows the higher in-plane bending rigidity, the lower out-plane bending rigidity and the favorable rubber penetrability.

The tire of the invention will do if the steel cord meeting the above conditions is applied for the crossing belt layers 2. It allows the effects of improving the steering stability and durability, so that structures and materials of other components are not specifically limited. For example, as shown in FIG. 1, bead cores 3 are embedded respectively in the pair of bead portions 11 of the tire of the invention and the carcass 1 is anchored by being folded back from the inside to the outside of the tire around the bead cores 3. A tread portion 12 is disposed around an outer periphery of the crown portion of the crossing belt layer 2 and a sidewall portion 13 is disposed on side portions of the carcass 1, respectively. It is also possible to dispose a cap layer 4 having a length in a width direction for covering at least the belt layers 2 and composed of rubberized reinforcing cords arrayed substantially in parallel with the tire peripheral direction and a pair of layer laminates 5 having a length in the width direction for covering an end of one side of the belt layers in the width direction, respectively, and composed of rubberized reinforcing cords arrayed substantially in parallel with the tire peripheral direction around the outer periphery of the crown portion of the crossing belt layers 2a and 2b for the purpose of enhancing the rigidity in the peripheral direction.

Embodiments

The invention will be explained below in detail by using embodiments thereof.

The pneumatic radial tire sequentially having the two layers of the crossing belt layers 2a and 2b composed of the rubberized steel cords, the cap layer 4 and the pair of layer laminates 5 in the radial direction of the crown portion of the carcass as shown in FIG. 1 has been fabricated. The steel cords that respectively meet conditions conforming to the following Tables 1 and 2 have been used. A size of the tire has been 225/45R17 and an angle of the crossing belt layers 2a and 2b has been ±63° with respect to the width direction of the tire. Still more, polyamide (nylon) cords have been applied to the cap layer 4 and the layer laminates 5. The respective specimen tires thus obtained were evaluated as follows. Tables 1 and 2 also show the result.

(Steering Stability)

Driving in terms of feeling of a driver was carried out by putting the respective specimen tires to an actual car in a circuit. Tables show results thereof (actual car evaluation result) by index numbers on the basis of Comparative Example 1 of 100. The larger the numerical values, the better the steering stability is.

(Corrosion Resistance)

The respective specimen tires were put to the actual car by filling an internal pressure corresponding to a maximum load capacity in JATMA YEAR BOOK after attaching them to a standard rim defined in the JATMA Standard. The tires were dissected to study corrosion length of the cord from cuts after driving a paved road of 50,000 km. Tables show the results by index numbers on the basis of the Comparative Example 1 of 100. The smaller the numerical values, the smaller the corrosion length is and is favorable.

(Length of Crack)

The respective specimen tires were put to the actual car by filling the internal pressure corresponding to the maximum load capacity in JATMA YEAR BOOK after attaching them to the standard rim defined in the JATMA Standard. The tires were dissected to study a length of crack of the cord from the cuts after driving the paved road of 50,000 km. Here, there is no problem in terms of durability if the length of crack is 5 mm or less. Those having the lengths of 5 mm or less are denoted by ○ and those having the length over 5 mm are denoted by x.

TABLE 1

| CODE STRUCTURE | EXAMPLE 1<br>1 × 8 OPEN | EXAMPLE 2<br>1 × 6 OPEN | EXAMPLE 3<br>2 IN PARALLEL + 6 | EXAMPLE 4<br>2 IN PARALLEL + 7 | EXAMPLE 5<br>3 + 7 |
|---|---|---|---|---|---|
| WIRE DIAMETER (mm) | 0.12 | 0.175 | CORE: 0.15<br>SHEATH: 0.175 | CORE: 0.12<br>SHEATH: 0.15 | CORE: 0.12<br>SHEATH: 0.15 |
| NUMBER OF WIRES | 8 | 6 | 8 | 9 | 10 |
| NUMBER OF DRIVEN CORDS (CORDS/50 mm) | 52 | 52 | 43 | 52 | 49 |
| DISTANCE BETWEEN CORDS (mm) | 0.41 | 0.43 | 0.55 | 0.42 | 0.5 |

TABLE 1-continued

| CODE STRUCTURE | EXAMPLE 1<br>1 × 8 OPEN | EXAMPLE 2<br>1 × 6 OPEN | EXAMPLE 3<br>2 IN PARALLEL + 6 | EXAMPLE 4<br>2 IN PARALLEL + 7 | EXAMPLE 5<br>3 + 7 |
|---|---|---|---|---|---|
| STEERING STABILITY (INDEX NUMBER) | 125 | 120 | 120 | 125 | 115 |
| LENGTH OF CORROSION (INDEX NUMBER) | 60 | 50 | 90 | 90 | 95 |
| LENGTH OF CRACK | ○ | ○ | ○ | ○ | ○ |

TABLE 2

| CODE STRUCTURE | COMPARATIVE EXAMPLE 1<br>3 × 4 | COMPARATIVE EXAMPLE 2<br>1 × 5 OPEN | COMPARATIVE EXAMPLE 3<br>1 × 5 OPEN | COMPARATIVE EXAMPLE 4<br>2 IN PARALLEL + 6 | COMPARATIVE EXAMPLE 5<br>2 IN PARALLEL + 6 |
|---|---|---|---|---|---|
| WIRE DIAMETER (mm) | 0.12 | 0.23 | 0.175 | CORE: 0.15<br>SHEATH: 0.175 | CORE: 0.15<br>SHEATH: 0.175 |
| NUMBER OF WIRES | 12 | 5 | 5 | 8 | 8 |
| NUMBER OF DRIVEN CORDS (CORDS/50 mm) | 37 | 35 | 35 | 35 | 56 |
| DISTANCE BETWEEN CORDS (mm) | 0.6 | 0.68 | 0.51 | 0.82 | 0.28 |
| STEERING STABILITY (INDEX NUMBER) | 100 | 70 | 80 | 90 | 120 |
| LENGTH OF CORROSION (INDEX NUMBER) | 100 | 60 | 60 | 90 | 90 |
| LENGTH OF CRACK | ○ | ○ | ○ | ○ | X |

As shown in Tables 1 and 2 described above, it was confirmed that the tires of the embodiments using the steel cords having the single strand structure or the core-single layer sheath structure composed of six to ten steel wires of 0.10 to 0.20 mm in diameter, the number of driven steel cords of 40 cords/50 mm or more and the distance between the adjacent steel cords within the belt layer of 0.3 mm or more allow the excellent steering stability and durability as compared tires of the comparative examples that did not meet these conditions.

The invention claimed is:

1. A pneumatic radial tire framed by a carcass toroidally extending between a pair of bead portions and having at least two layers of crossing belt layers formed by rubberizing steel cords and disposed around an outside of a crown portion thereof in a radial direction,
   wherein the steel cord is composed of eight to nine steel wires of 0.10 to 0.20 mm in diameter, a number of driven steel cords is 52 to 60 cords/50 mm and a distance between the adjacent steel cords within the belt layer is 0.3 mm or more, and
   wherein the steel cord has a core-single layer sheath structure in which two of the steel wires are disposed in parallel without being stranded from each other as a core and the remaining six to seven steel wires are stranded around the core so as to have gaps into which rubber can infiltrate between at least one set of adjacent steel wires.

2. The pneumatic radial tire according to claim 1, wherein the steel cord has a structure stranded so as to have gaps into which rubber can infiltrate between at least one set of adjacent steel wires positioned at an outermost layer of the cord.

3. The pneumatic radial tire according to claim 1, wherein a sectional shape of the steel cord is flat and the flat sections in a major axis direction are arrayed along a width direction of the belt layer.

4. The pneumatic radial tire according to claim 1, wherein the distance between the adjacent steel cords within the belt layer is 0.4 to 1.0 mm.

* * * * *